Oct. 18, 1960
A. A. CHARRON
2,956,464
NOTCHING PRESS WITH WORK INDEXING
MEANS AND TOOL DISABLING MEANS
Filed Sept. 29, 1955
2 Sheets-Sheet 2
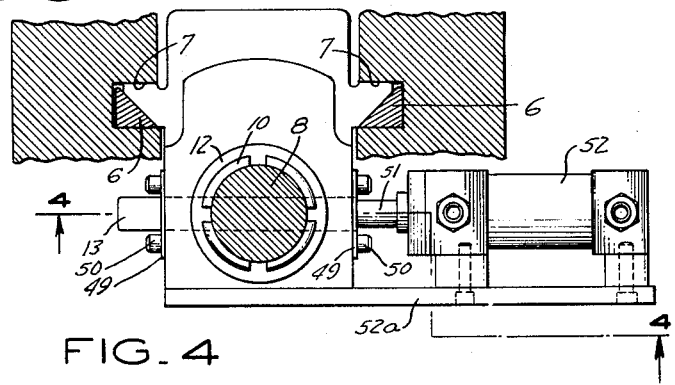
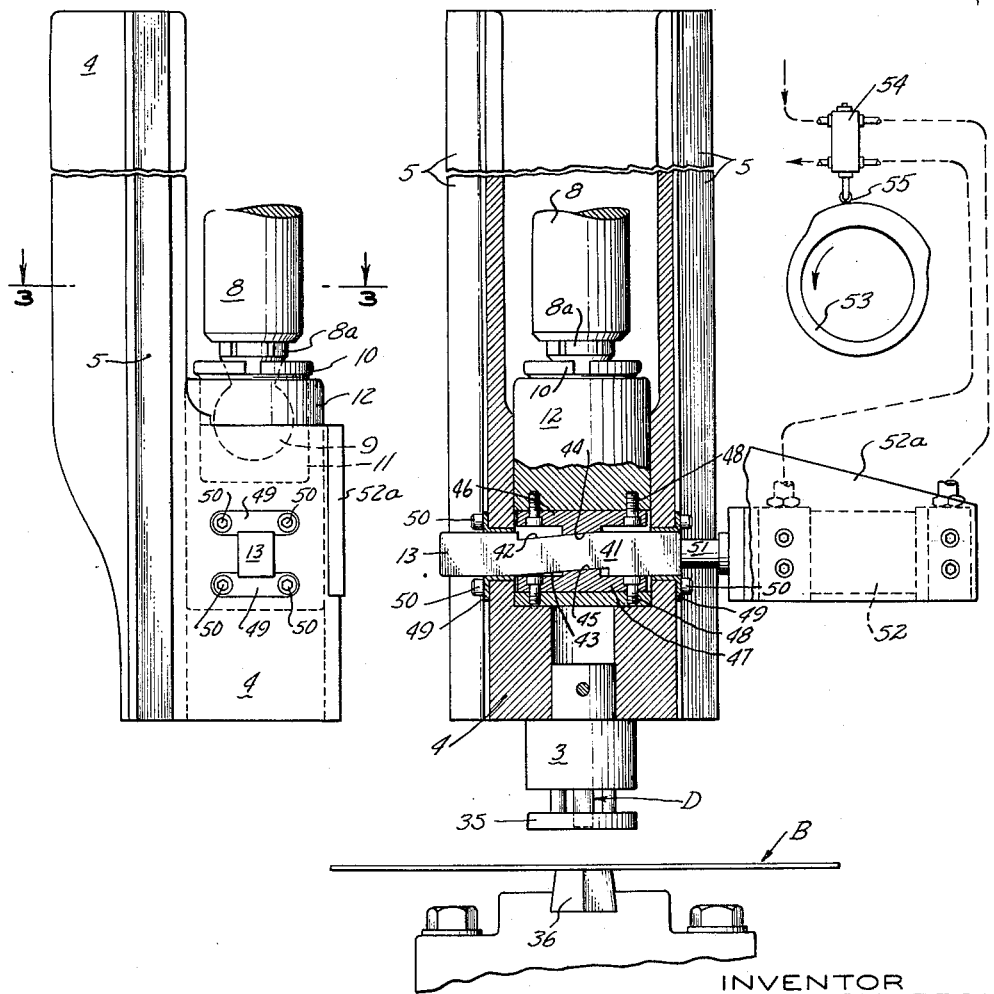
INVENTOR
ARTHUR A. CHARRON
BY *Bates & Willard*
ATTORNEYS United States Patent Office 2,956,464
Patented Oct. 18, 1960

2,956,464

NOTCHING PRESS WITH WORK INDEXING MEANS AND TOOL DISABLING MEANS

Arthur A. Charron, Ancram, N.Y., assignor to Emhart Manufacturing Company, Hartford, Conn., a corporation of Delaware Filed Sept. 29, 1955, Ser. No. 537,339

2 Claims. (Cl. 83—257)

The present invention relates to notching presses and more particularly to the so-called "skip-notching" in which the inner or outer peripheries, or both, of circular or annular work pieces, such as motor laminations or the like, are punched or die cut to provide a selected pattern of notches or serrations in the periphery. In those instances where the selected notching pattern involves successive notches spaced by unnotched peripheral portions or teeth of equal width, it is necessary only to angularly index the blank equal amounts between strokes of the punch, each stroke of which is a cutting or work stroke.

However, a problem is created when the selected pattern involves a greater spacing between some notches than others. One solution to the problem has been to make the operation of the die or punch intermittent by repeatedly clutching and unclutching the punch or die drive and to index the blank in the selected pattern between strokes of the die.

Considerable more clutch wear resulted from this intermittent operation than when the indexing of the blank is effected between strokes of a continually clutched and operated die.

Disadvantages also are presented by indexing mechanisms designed to effect, in accordance with the selected notch pattern, dissimilar angular movement of a blank between successive uninterrupted strokes of a continually clutched press plunger.

An object of the present invention is to provide improved notching process and apparatus with which irregular notching patterns may be selectively produced with a press, the plunger of which is continually operated during the notching cycle for the blank and in which the angular indexing of the blank relative to the notching tool is in successive equal amounts.

A further object is to provide in a notching press of the character described, means for selecting a desired cutting and non-cutting pattern for successive strokes of the cutting tool for a series of indexing movements of the work piece.

With these and other objects in view, the invention consists of the features of construction and operation and the arrangement and combinations of parts, hereinafter described and claimed, reference being had to the accompanying drawings in which:

Fig. 2 is an enlarged side elevation of the press pitman and tool holder slide shown in Fig. 1;

Fig. 3 is a cross-sectional view taken on line 3—3 of Fig. 2; and

Fig. 4 is a cross-sectional view taken on line 4—4 of Fig. 3 and showing details of an operable skip-notching connection between the pitman and tool-holder slide as provided by the invention.

Figure 1:
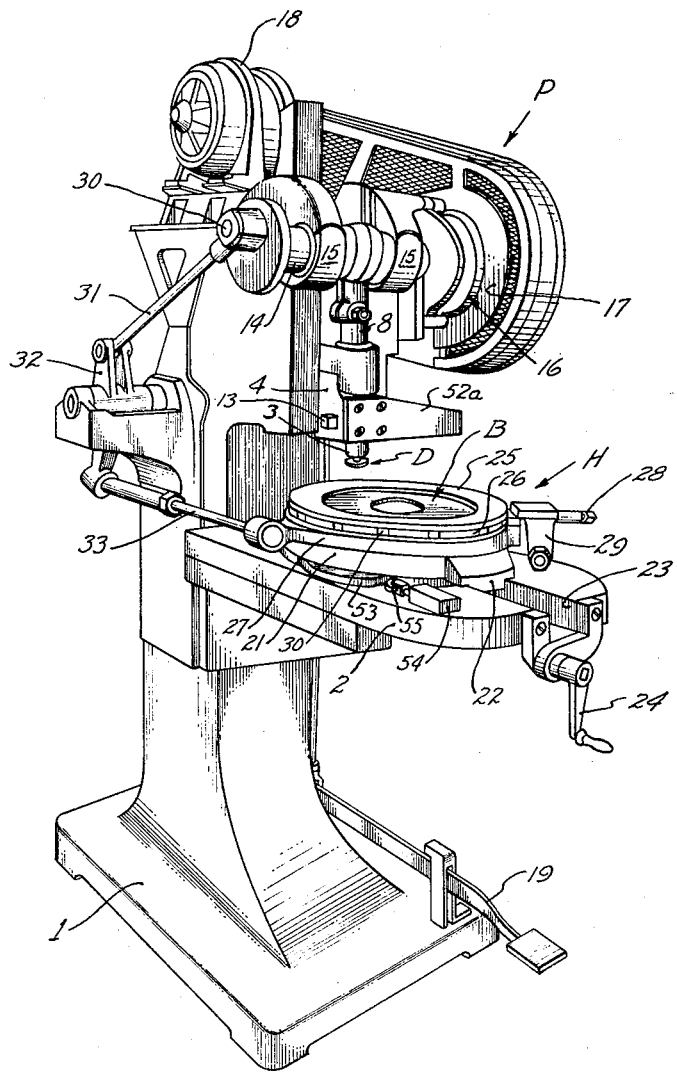
Figure 1 is a perspective view of a notching press embodying the invention.

Referring to Fig. 1, there is shown a press which is generally designated P and which generally includes a pedestal or base 1 having a work table 2 on which a work piece or blank B may be secured for successive cutting or punching operations by a notching punch or die D.

The die D is mounted in a die holder 3 that is pinned to a slide 4 having, as shown in Figs. 3 and 4, gibs 5 which support the slide 4 for vertical reciprocation on gib keys 6 in vertical guideways 7 formed in the pedestal member 1.

Reciprocation of the slide 4 to which die holder 3 is pinned is effected by a pitman or ram 8 having a screw 8a, the lower end of which is a ball 9 that is secured by a cap nut 10 of a ball joint socket member 11 which is secured by threads in a member 12 that is operatively secured by a key or gag 13 to the slide 4.

As shown in Fig. 1, the pitman 8 is mounted on the eccentric of a crank shaft 14 which is journaled in bearings 15 on the press pedestal and operatively connectable through a clutch-brake 16 with a flywheel 17 which is belt driven by motor 18.

A clutch pedal 19 is provided for clutching the flywheel 17 to the shaft 14 and for braking rotation of the shaft 14 when the shaft is declutched from the flywheel.

As shown in Fig. 1, the work piece disc or blank B is releasably securable in rotatable support means comprising an indexing ring holder generally designated H which is adjustably and operably mounted on the bolster table 2.

More particularly, the illustrated holder H includes a circular base 21 having a slide portion 22 which is slidably mounted in a guideway 23 in the table 2 and is movable by a crank 24 so as to position blanks B of different sizes which may be held in the holder H in the proper location for rotation to present successive portions of the blank periphery in proper notching alignment with the die D.

Mounted for rotation on the holder base 21 is a disc or blank holder clamping ring 25, including an indexing ring 26 on which is operatively mounted an annular driving lever 27 for rotating the indexing and clamping rings 25 and 26 to successive blank-notching positions at which the blank B is held by engagement of the locking pawl 28 of a locking mechanism 29 with the positioning indentations 30 of the indexing ring 26, while each successive stroke of the press pitman 8 and the die D is effected.

In the illustrated embodiment of the invention, the indexing movement of the annular driving lever 27 is effected automatically between each downstroke of the press pitman 8 whereby to cause rotation of the workpiece support means and workpiece in relation to reciprocation of the ram. As shown in Fig. 1, there is secured to the drive shaft 14 of the press, a crank 30 which is connected by a connecting rod 31 with an end of a rocker arm 32 which is pivotally mounted on the press pedestal 1 and the other end of which is connected through an adjustable length connecting rod 33 with the indexing lever 27. The crank 30 is disposed at approximately 90° to the pitman eccentric so that during the portion of the upstroke, after the die D has cleared the blank B and for so much of the remainder of a half revolution of the press crank 14, the clamping and indexing rings 25 and 26 are angularly advanced so as to locate successive indexing notches 30 in locking engagement with the pawl 28 and thereby locate the blank B in successive notching positions. The aforedescribed crank 30, connecting rod 31, rocker arm 32, etc. comprise motion transmitting means operatively connected between the ram or its drive means and the workpiece support to rotate the workpiece in relation to reciprocation of the ram.

It will be understood that the above-described workpiece indexing holder H is merely illustrative of many customary assemblies for indexing a work piece in timed relation to the operation of a press which are suitable for use in practicing the present invention.

Moreover, while the illustrated clamping and indexing mechanism is intended for notching the inner periphery of an annular work piece, it will be understood that it also is generally illustrative of mechanism for holding and indexing work pieces for notching of outer as well as inner peripheries.

As shown in Fig. 4, the die holder 3 preferably includes a spring pressed stripper plate 35 to assure that the work piece is cleanly stripped without excessive chatter from the die D as the die is withdrawn following a notching operation.

Also located beneath the die D, and in alignment therewith on the bolster table 2, is a die block 36 which supports the blank B and cooperates with the die D in effecting the notching cuts.

In accordance with a preferred embodiment of the invention, down or work strokes of the die D are cutting and non-cutting strokes in a selected pattern without interruption in the operation of the shaft 14 and the reciprocation of the pitman 8 and die D.

Moreover the pattern of cutting and non-cutting strokes may be varied as desired so that notched discs may have widely different patterns of skips and multiple skips between notches.

More particularly, in the embodiment illustrated, the key or gag 13 connecting the press slide 4 to the pitman connector or block 12 is movable between work strokes of the pitman ram 8 and while the pitman is operating, so as to raise the slide 4 and die D relative to the pitman block 12, whereby the die remains above its cutting position with respect to the die block 36 and blank B during the work stroke of the slide.

Moreover, the key 13 also is movable during operation of the pitman 8 to lower the die D relative to the pitman 8 and to a position in which the die D notches the blank B at the bottom of the work stroke.

As shown in Fig. 4, the key or gag 13 includes a central cam portion 41 having upper and lower parallel camming surfaces 42 and 43 which are slightly inclined to the horizontal and slidably engage cam surfaces 44 and 45, respectively, of hardened cam inserts 46 and 47, which are secured by screws 48 to the upper and lower surfaces of a passage through the pitman connector or block 12.

Hardened bearing plates 49 also may be secured as by bolts 50 to the slide 12 so as to provide upper and lower bearing surfaces for the key 13 where the key extends from the slide 12.

As shown in the drawings, the key 13 is secured to and is slidable longitudinally within the cam surfaces 44 and 45 and the bearings 49 by the piston rod 51 of a motor 52 which is fastened by a bracket 52a to the slide 4.

As is shown in Fig. 4, the motor 52 is hydraulic and is controlled by a timer cam or valve actuator which is schematically shown at 53 and which operates a motor control valve 54 through cam follower 55 so as to operate the motor 52 and thereby advance and retract the key 13 in accordance with any preselected pattern.

The cam 53 may be secured to and rotated by workpiece support means including the indexing ring 26, as shown in Fig. 1.

However, it will be understood that the cam 53 shown in Fig. 4 is a schematic illustration of various conventional cycle controllers which may be adjusted and modified to effect any selected pattern of operation for the valves 54 and motor 52. As illustrative of such controllers are the Cyclo-Monitors of the Counter and Control Corporation, 5225 W. Electric Avenue, Milwaukee 14, Wisconsin, the details of which form no part of the present invention.

In the illustrated embodiment of the invention, movement of the key 13 to the right from the position shown in Fig. 4 causes the key to slide up the inclined surface 45 of the insert 47 and thereby raises the key, the upper horizontal surfaces of which raise the slide 4 relative to the pitman block 12 and thereby elevate the die D so that the die at the bottom of its stroke remains above the blank B and "skips" notching the underlying portion of the blank B in that indexed position of the blank. Thus, it can be said that the key or gag 13 adjusts the effective length of the stroke of the press ram.

Thereafter, when the blank B is reindexed by the driving lever 27 during the up-stroke of the die D, the die may remain raised in the skip-notching position, or may be lowered as the selected pattern of the controller cam 53 dictates. When a cutting or notching operation is required at a particular indexed position of the blank, the motor 52 is operated by the controller 53 to move the key 13 to the left to the position shown in Fig. 4 in which the slide 4 moves to its lower position relative to the pitman block 12, as shown in Fig. 4, so that the die effects a notching cut in the blank B during the downstroke of the press.

It will be apparent that the present invention provides improved means for and method of moving a die relative to a press pitman and to a die block independently of and during the normal operation of the pitman, and without interrupting or unclutching the pitman drive. Moreover, the independent movement of the die relative to the pitman is effected between and coordinated with successive indexing movements of a workpiece relative to the die and die holder.

While a preferred embodiment of the invention has been herein illustrated and described, it will be understood that the invention may be embodied in other forms within the scope of the following claims.

Having thus described the invention, I claim:

1. In a power press, a generally horizontal support and clamping ring for holding a workpiece, a vertically reciprocable ram carrying a die member adapted for operation on a workpiece held by said support ring, a driving motor, mechanical means connecting said ram with said motor for reciprocation of the former and also connecting said ram with said support ring, said support ring being rotated through a predetermined angle by said mechanical means for each reciprocation of said ram and during that portion of each ram reciprocation when the die member carried thereby is above a workpiece held by said support ring, means interconnecting the ram and the die member carried thereby including a cam reciprocable transversely of the ram for raising and lowering the die member relative to the ram a distance sufficient to provide for location of the die member respectively above and below a workpiece held by the support ring when the ram is in its lowermost position, an hydraulic motor operatively connected with said cam for reciprocating the same whereby to selectively raise and lower said die member respectively to effect non-cutting and cutting downward strokes of said ram and die member, a control valve for said hydraulic motor having an operating plunger movable in one and an opposite direction for actuating the valve and thereby causing the motor to reciprocate said cam, and a rotary actuator cam fixedly mounted with respect to said rotatable support ring, said actuator cam being operatively associated with said control valve plunger whereby to operate said valve to selectively effect non-cutting and cutting downward strokes of said ram and die member.

2. In a power press, a generally horizontal support and clamping ring for holding a workpiece, a vertically reciprocable ram carrying a die member adapted for operation on a workpiece held by said support ring, a driving motor, mechanical means connecting said ram with said motor for reciprocation of the former and also connecting said ram with said support ring, said support ring being rotated through a predetermined angle by said mechanical means for each reciprocation of said ram and during that portion of each ram reciprocation when the die member carried thereby is above a workpiece held by said support ring, means interconnecting the ram and the die member carried thereby including a cam reciprocable transversely of the ram for raising and lowering the die member relative to the ram a distance sufficient to provide for location of the die member respectively above and below a workpiece held by the support ring when the ram is in its lowermost position, motor means operatively connected with said cam for selectively reciprocating the same whereby to selectively raise and lower said die member respectively to effect non-cutting and cutting downward strokes of said ram and die member, and control means for said motor means including a rotary actuator cam fixedly mounted with respect to said rotatable support ring.

References Cited in the file of this patent

UNITED STATES PATENTS

| | | |
|---|---|---|
| 154,049 | Ivens | Aug. 11, 1874 |
| 627,153 | Tennant | June 20, 1899 |
| 640,426 | Stanbow | Jan. 2, 1900 |
| 1,414,555 | Donley | May 2, 1922 |
| 1,510,261 | Daniels | Sept. 30, 1924 |
| 1,856,175 | Towle | May 3, 1932 |
| 2,148,221 | Schneider | Feb. 21, 1939 |
| 2,433,117 | Hollander | Dec. 23, 1947 |
| 2,548,562 | Slathar | Apr. 10, 1951 |
| 2,576,328 | Allison | Nov. 27, 1951 |